United States Patent
Csipkes et al.

(10) Patent No.: US 6,178,285 B1
(45) Date of Patent: Jan. 23, 2001

(54) VISION SYSTEM FOR INSPECTING INTERCONNECTIONS OF OPTICAL CARDS MOUNTED IN A RACK AND ASSOCIATED METHODS

(75) Inventors: Andrei Csipkes, Savage; Iqbal M. Dar, Odenton; Qiong Zhan, Ellicott City, all of MD (US); Glen D. Porter, Norcross, GA (US)

(73) Assignee: CIENA Corporation, Linthicum, MD (US)

( * ) Notice: Under 35 U.S.C. 154(b), the term of this patent shall be extended for 0 days.

(21) Appl. No.: 09/168,320

(22) Filed: Oct. 8, 1998

(51) Int. Cl.[7] ........................................ G02B 6/00
(52) U.S. Cl. ............................... 385/147; 385/133
(58) Field of Search ....................... 385/133, 147

(56) References Cited

U.S. PATENT DOCUMENTS 5,724,127   3/1998  Csipkes et al. .

*Primary Examiner*—Frank G. Font
*Assistant Examiner*—Reginald Ratliff
(74) *Attorney, Agent, or Firm*—Daniel N. Daisak; David L. Soltz

(57) ABSTRACT

A vision system is provided which allows viewing and/or inspection of an end surface of an optical fiber through a bulkhead on a backplane of a rack. By placing such a vision system on a mount configured to be inserted in the rack, the use of such a vision system does not require the rack design be modified or that other modules be removed. Preferably an adapter for mating the vision system with the bulkhead may be moved to position the adapter relative to the bulkhead housing the fiber of interest.

24 Claims, 4 Drawing Sheets

VISION SYSTEM FOR INSPECTING INTERCONNECTIONS OF OPTICAL CARDS MOUNTED IN A RACK AND ASSOCIATED METHODS

BACKGROUND OF THE INVENTION

1. Field of the Invention

The present invention is directed to a vision system which allows inspection of interconnections of optical cards or modules mounted in a rack. More particularly, the present invention is directed to forming such a vision system on a mount which is itself mounted in the rack and which can be used for inspection of fibers in a backplane of the rack while so mounted.

2. Description of Related Art

More and more fiber optics are being used to carry data. To transmit electronic data over an optical fiber, the electronic data is converted into light and sent along the fiber until it reaches its destination where the light is converted back into electronic signals. The optical fiber usually is connected to a fiber in a module or optical card through a bulkhead. The module may be purely optical or electro-optical. The module may perform various functions such as reamplifying the light signals, filtering the light signals, converting the light signals, etc.

Complex systems composed of a plurality of modules are mounted in a rack to facilitate interconnections therebetween. The interconnections are provided by fiber optics in a back plane of the rack. The fiber optics must be inspected and cleaned during, e.g., set up, installation, reconfiguration, and troubleshooting, in order to insure good performance or to determine where a problem in the system is arising. Such an inspection includes determining if there are any defects, such as cracks, scratches, chips, dirt, etc. on the end surface of the optical fiber. Inspection of a fiber optic for defects requires high magnification and high depth perception. A desired magnification for inspection is on the order of approximately 400×–800×. Optics providing high magnification require bright light.

Recently, inspection of an end of a fiber optic with a bulkhead connected thereto was disclosed in U.S. Pat. No. 5,724,127 to Csipkes et al. entitled "A System and Method for Inspecting an End of a Fiber Optic", the entire contents of which are incorporated by reference. However, the spacing of the cards in the rack, typically on the order of 1 inch or less, prohibits such an inspection system, or any commercially available microscope, from being inserted therebetween. Removal of adjoining modules in the shelves is not an acceptable answer, since such removal would disrupt the testing sequence. Also, there is a risk of damaging the module connectors when removing the modules. The problem is further compounded with the requirement of high magnification. Finally, using an unguided probe microscope presents both magnification/resolution problems as well as risk of optical interface damage due to an unstable linkage to a rigid body.

SUMMARY OF THE INVENTION

The present invention is therefore directed to a vision card for inspecting connections between optical cards in a rack which substantially overcomes one or more of the problems due to the limitations and disadvantages of the related art.

It is an object of the present invention to provide a vision system which allows viewing of the end of an optical fiber in a fiber connector in a backplane of the rack without requiring removal of the fiber connector or of adjacent modules in the rack.

These and other objects may be realized by providing an apparatus for inspecting an end surface of an optical fiber in a bulkhead containing an end surface of an optical fiber to be inspected on a backplane of a rack including: a vision system containing an adapter for connecting the vision system to the bulkhead, a light generator generating light to be delivered to the end surface, and an image capturer receiving an image of the end surface illuminated by the light and a mount on which the vision system is mounted, the mount being configured to be received by the rack.

The mount may be a panel having a height of a module to be inserted into the rack. A vertical rail system may be provided on the panel for moving the vision system vertically on the panel.

The apparatus may include a hollow tube containing a magnifying lens, the adapter being connected to an end of the tube, the tube delivering light to the end surface and delivering an image to the image capturer. The hollow tube may include a relay lens for relaying an image from the magnifying lens to the image capturer. A focus knob for adjusting a focus position of the magnifying lens may be included.

A housing containing the light source and the image capturer, may be mounted adjacent the tube at an end opposite the adapter. The housing may serve as a handle for pressing the tube into contact with the bulkhead.

The tube may be mounted on a panel having a height of a module to be inserted into the rack. The tube may be fixedly mounted on the panel. A vertical movement assembly may be provided on the panel for permitting continuous adjustment of a vertical position of the tube along the height of the panel. A holding plate may be mounted in the rack, wherein the tube includes spring mounted flanges for removably mounting the tube in the holding plate. Guide slots may be used for locking the tube into position. The guide slots may be configured in predetermined locations in accordance with a particular module to be inserted in the rack. The guide slots may be removably provided on a panel on which the tube is movably mounted.

A display may be provided for displaying at least one of an image of the fiber in the bulkhead and results from an automated inspection of the fiber in the bulkhead. The display may be mounted on a telescoping mount. The display may be mounted on a support removably attached to the rack.

These and other objects may also be realized by providing a method of inspecting an end surface of an optical fiber on a backplane of a rack, including: providing a vision system containing an adapter for connecting the vision system to a connector connected to the end surface of the optical fiber on the backplane of the rack, a light generator generating light to be delivered to the end surface, and an image capturer receiving an image of the end surface illuminated by the light generator on a mount configured to be received by the rack; mounting the mount containing the vision system in the rack; and mating the adapter to the connector.

After the mounting, the adapter may be moved relative to the end surface. The adapter may be moved via a control mounted on a front face of the mount containing the vision system. An image processor may be provided on one of the mount and another module configured to be received by the rack in the rack and used to automatically inspect the fiber. The image output by the vision system may be displayed.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, aspects and advantages will be described with reference to the drawings, in which.

DETAILED DESCRIPTION OF PREFERRED EMBODIMENTS

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation.

In accordance with the present invention generally, a vision system includes a relay lens used to supply a highly magnified image to a small camera system, all of which are thin enough to fit between the modules in the rack. The vision system also includes a mount which provides both alignment and structure for inserting the optical components in between the modules.

Figure 1:
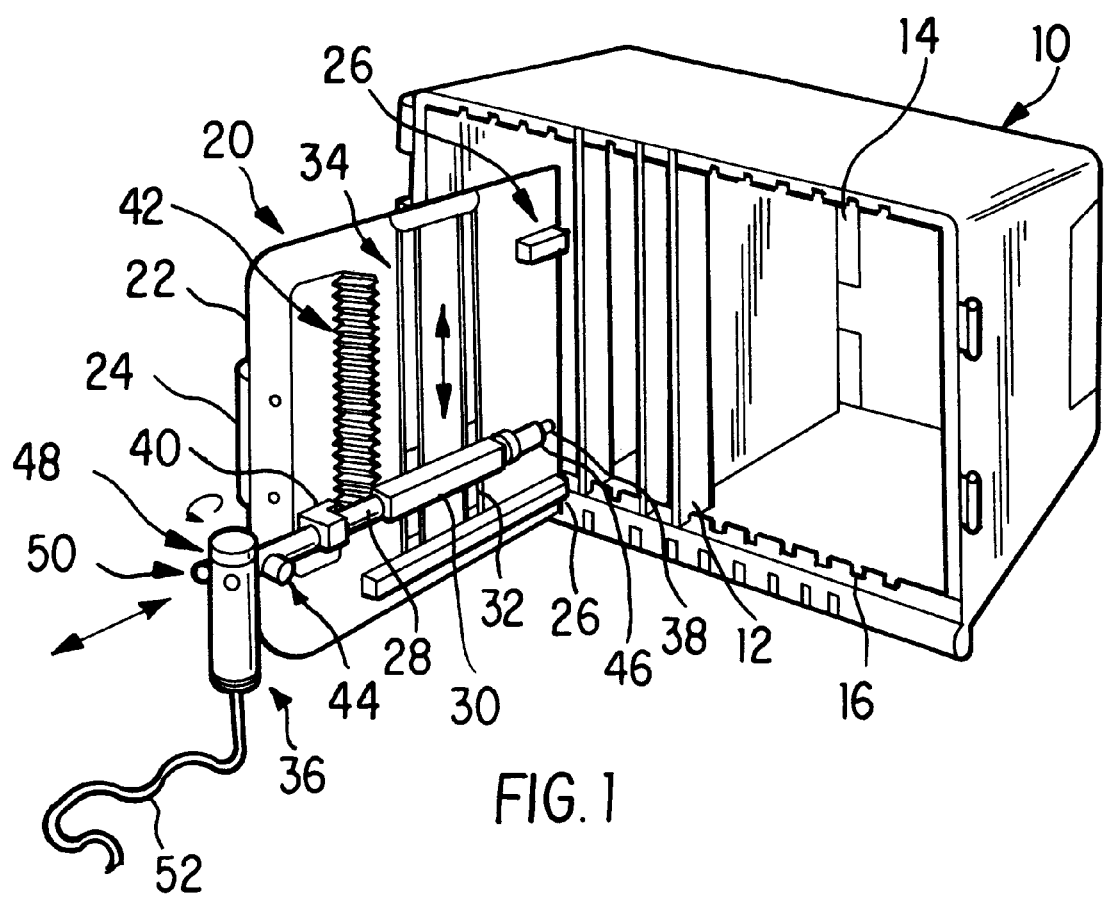
FIG. 1 is a perspective view of a vision system of the present invention mounted on a panel being inserted into a shelf.

One embodiment of the present invention is shown in use in FIG. 1. A shelf 10, which is typically arranged in an array with other shelves to form a complete rack system, has modules 10 housed therein. Each module with optical components is connected to at least one bulkhead connection 14 for connecting the module to other modules or to external components. The shelf 10 also includes grooves 16 into which the modules 12 slide to insure proper alignment with the backplane bulkhead connectors 14.

A vision system 20 includes a card 22 on which optical components are mounted. The panel 22 has a form factor matching that of the modules, so that it may be inserted in the grooves and to insure that the vision system will be aligned in the horizontal direction with the location of any backplane bulkhead connectors. The panel 22 preferably includes a handle 24 for ease of insertion/removal of the vision system. The panel 22 also preferably includes guide hole brackets 26 located on the insertion edge mounted on the top and bottom side of the panel 22. Once the inside panel edge is nearing the bulkheads, the guide hole brackets 24 slide over the existing brass dowels which are typically part of the shelf, further insuring correct alignment and allowing the vision system to slide in and out of the bulkhead in a perpendicular fashion.

The optical components of the vision system are housed in a hollow tube 28 which extends along the panel 22. This hollow tube 28 is itself inserted into a vertical slide mount 30 which in turn is attached to vertical slides 32 mounted within vertical rails 34. As indicated by the arrows between the vertical rails, the vertical slides 32 allow the position of the tube 28 containing the optical components to be altered in the vertical direction to allow alignment of the vision system with the bulkhead connector to be inspected. This vertical motion may be realized by having an operator use an active component housing 36 as a handle and moving the active component housing 36 up and down. This vertical motion is realized while the panel remains locked into place.

In addition to the vertical movement, the tube 28 can move in and out a fixed short distance to engage and disengage with the bulkhead connector to be inspected. Once the vision system is in a desired vertical position, a scope arm 40 is guided into guide slots 42 in the panel 22. The guide slots 42 create a fixed distance to the bulkhead so that a bulkhead adapter 38 on the end of the tube 28 engages with the bulkhead to be inspected. This engagement between the bulkhead adapter and the bulkhead may be realized as set forth in U.S. Pat. No. 5,724,127 discussed above. Any of the bulkhead adapters disclosed in the '127 patent may be used, although it is to be understood that the vision system may mate with a number of different bulkheads using appropriate bulkhead adapters and that the bulkheads discussed in the '127 patent are merely illustrative. The guide slots 42 also securely hold the tube in the desired position.

As an alternative to the closely spaced guide slots 42 shown in FIG. 1, the guide slots 42 may be designed to locate the tube at predetermined positions in accordance with a type of module to be inserted in the slot being inspected. The position of the interconnections for each particular type of module is known. Further, such specific guide slots may be removable, e.g., provided on a plate which is secured to the panel in a removable fashion.

Figure 2:
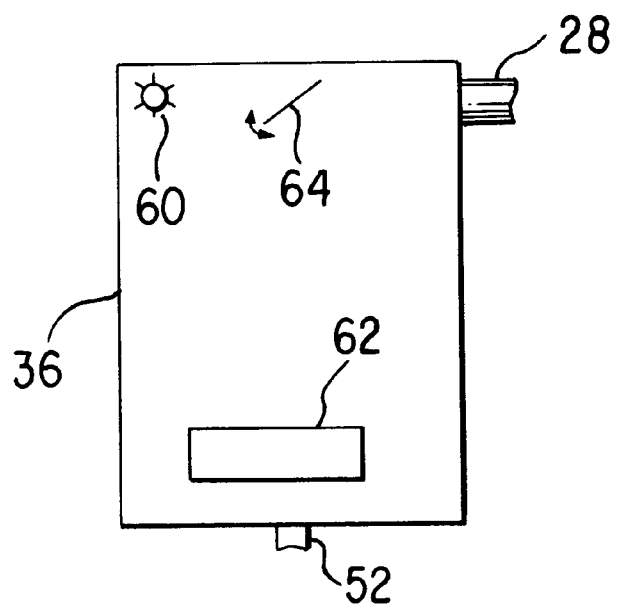
FIG. 2 is a schematic cross-section of an active component configuration in the housing shown in FIG. 1.

Once locked into place, the active component housing 36 which houses a light source 60 and an image receiver 62, e.g., a charge-coupled device (CCD), shown in FIG. 2, illuminates the bulkhead through the hollow tube and retrieves the image of the bulkhead. A cable 58 provides power for the light source 60 and the image receiver 62 and delivers the signal from the image receiver 62 to an external device for further processing. The active component housing also includes a centering knob 50 which insures that the image of the bulkhead connector is centered on the image receiver 62.

The active component housing 36 also includes a focus lock 48 which locks/unlocks a focus knob 44. The focus knob 44 is used for fine adjustment of the focus of the optical elements in the tube 28, specifically located near the bulkhead connector in an optical component section 46 of the tube 28. Once the tube is engaged and locked into a slot, the focus lock 48 is loosened to allow focus adjustment with the focus knob 44.

As shown in the schematic cross-section in FIG. 2, the active component housing 36 houses the light source 60, an optical component 64, and the image receiver 62. Light from the light source passes through the first optical component 64 to the tube 28, where it is delivered to the bulkhead connector to be inspected. The tube 28 in turn delivers the image of the bulkhead connector to the active component housing 36. The optical component 64 delivers the image to the image receiver 62. The optical component 64 may be rotated as indicated by the arrow by the movement of the centering knob 50. The image receiver 62 may be a charge-coupled device (CCD) or any other type of device which converts optical images into electrical signals. Any of the light source, optical component, CCD arrangements set forth in the '127 patent may be employed. Alternatively, the light source may be positioned outside the active component housing 36 and delivered to the tube 28 by a fiber. The output of the image receiver 62 is connected via a cable 52 to a processing device and/or a display.

Figure 3:
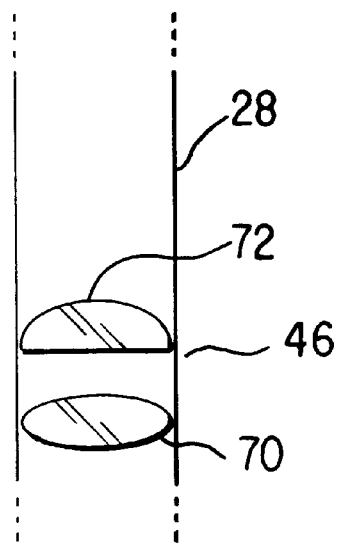
FIG. 3 is a schematic cross-section of the optical components within the tube of FIG. 1.

The optical components located in section 46 of the tube 28 are shown in FIG. 3. A magnifying microlens 70 supplies a desired magnification to the image of the bulkhead connector. If the magnifying microlens 70 is placed in front of the image receiver, then the distance between the object and the image as it appears on the image receiver plane is the image distance. Due to the length of the optical path within the tube, typically 7–8", and space restrictions between the modules, typically less than 1", a magnifying microlens may not provide sufficient image quality to perform inspection. If it does not, then a relay lens 72, such as a gradient index (GRIN) lens, may be used to relay the image from the magnifying microlens a distance to the position of the image receiver, thereby effectively lengthening the apparent image distance of the magnifying microlens. If the microlens itself can provide a sufficiently magnified image of acceptable quality with a long enough image distance, the relay lens 72 is not needed. During focusing by the focus knob 44, the microlens is moved through the tube 28 in any conventional manner while maintaining the tube in a locked position. For example, the inner surface of the tube could be threaded and the focus knob used to rotate the microlens through the tube. If the relay lens 72 is included, it is moved in tandem with the microlens.

Figure 4:
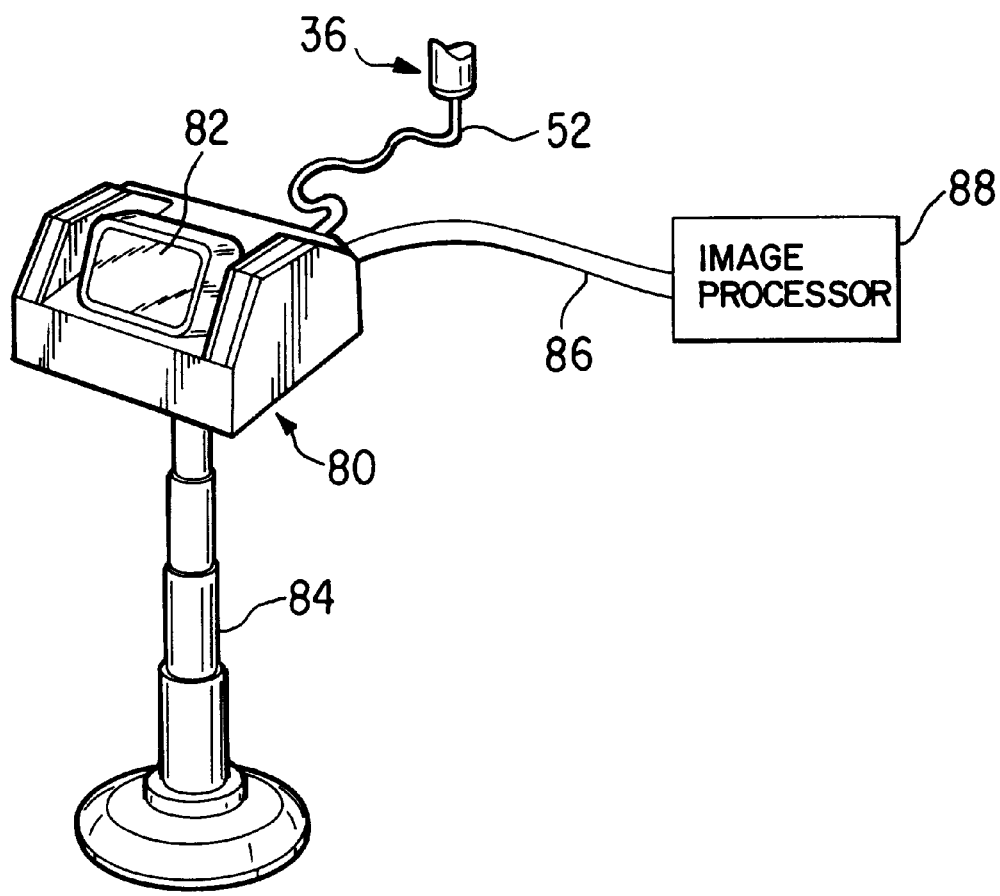
FIG. 4 is a perspective view of a display screen and associated mount for viewing results of the inspection.

The signals output by the image receiver 62 may be supplied to a video monitor 82, as shown in FIG. 4. The video monitor 82 is preferably mounted on a video mount 80 which also encloses a power supply for both the video monitor 82 and the active elements in the active element housing 36. If the inspection is to be other than an on-site, instantaneous visual inspection, the output of the image receiver may also be supplied to an image processor 88 via a cable 86. The image processor 88 may be used to transmit the images to a remote location, store the images, and/or conduct an automated assessment of the fiber optic in the bulkhead. If the display is only to be remote, the video monitor 80 is not needed. If an automated assessment is conducted by the image processor 88, the result of this assessment may also be displayed on the video monitor. The image processor 88 may be external as shown in FIG. 4, may be integrated with the video mount 82, or may be provided on a module in the rack, either the same module as the vision system or on another module.

Figure 5:
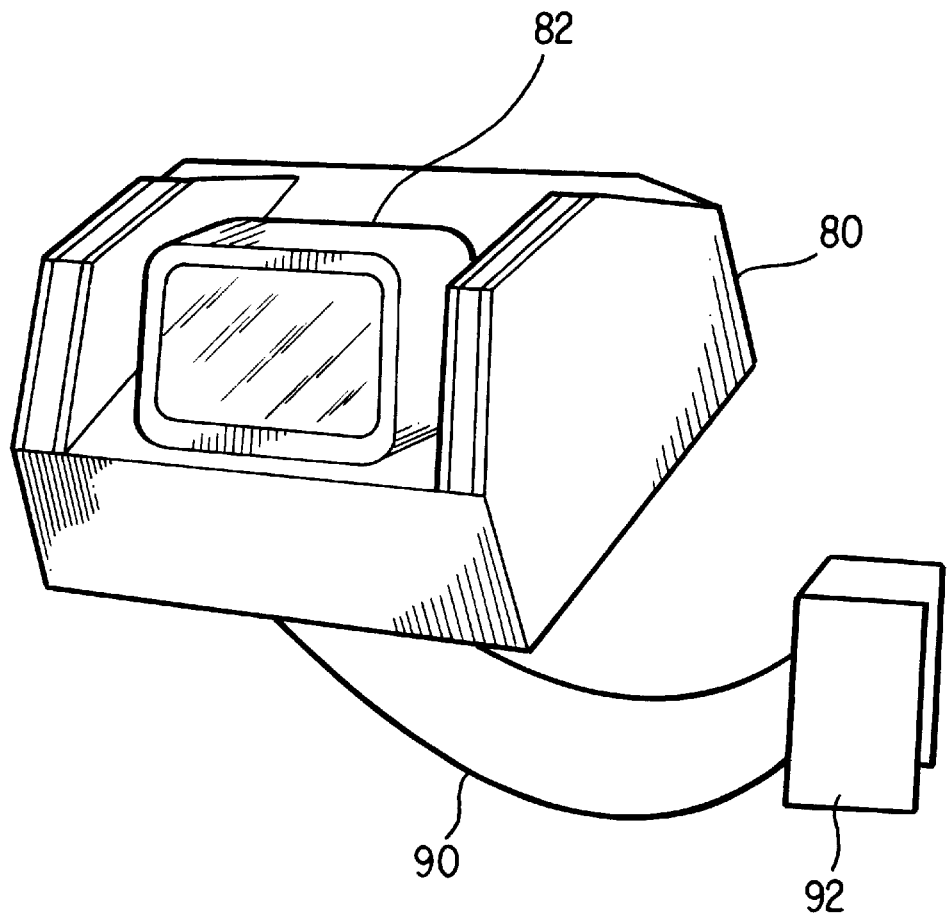
FIG. 5 is a perspective view of a display screen and another associated mount for viewing results of the inspection.

The video mount 80 may be mounted on a telescoping base 84 to be attached to a flat surface, such as the top of the rack, the floor, a table, etc. The telescoping base 84 allows the height of the video monitor 82 to be adjusted as desired by a user. Alternatively, as shown in FIG. 5, the video mount 80 may be mounted on a flexible arm 90 connected to a clamp 92 which may be clamped to the end of the panel 22, the shelf 10 or at any desired location and then adjusted for a user.

Figure 6:
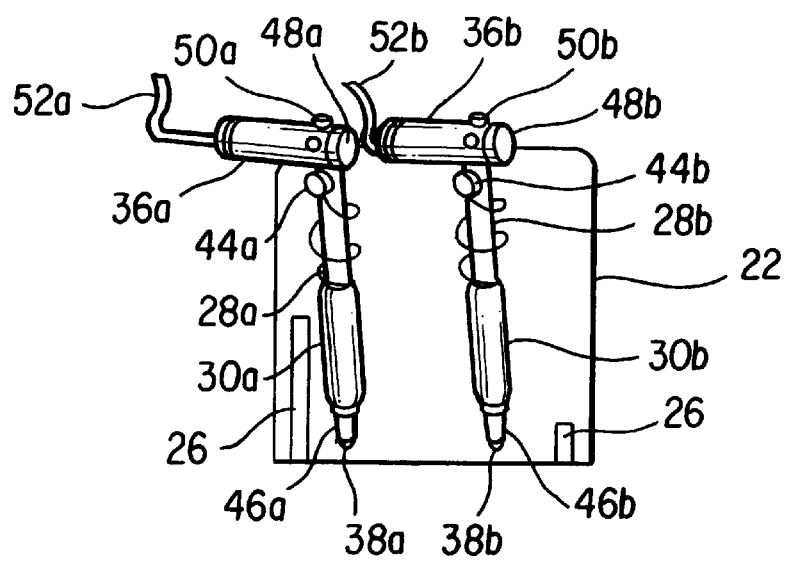
FIG. 6 is a front view of the vision system of the present invention mounted on a panel in a vertically fixed configuration.

An alternative to the vertical adjustment system is shown in FIG. 6. A vision system of the present invention may be designed to work with a specific module. Bulkheads associated with a specific module have predetermined positions. Therefore, a tube and all associated elements could be fixedly positioned for each bulkhead, alleviating the need for the vertical adjustment, speeding up the process, and allowing multiple bulkheads to be processed simultaneously. Preferably, all of the cables 52 would supply signals to a single video monitor and/or image processor.

In the example shown in FIG. 6, two such tubes 28a, 28b are provided. All the elements were described above in conjunction with FIG. 1, and will not be described again, as they have the same reference numerals with an additional letter differentiation. The mounts 30a, 30b are no longer attached to the vertical slides, but are fixedly attached to the panel 22.

Figure 7:
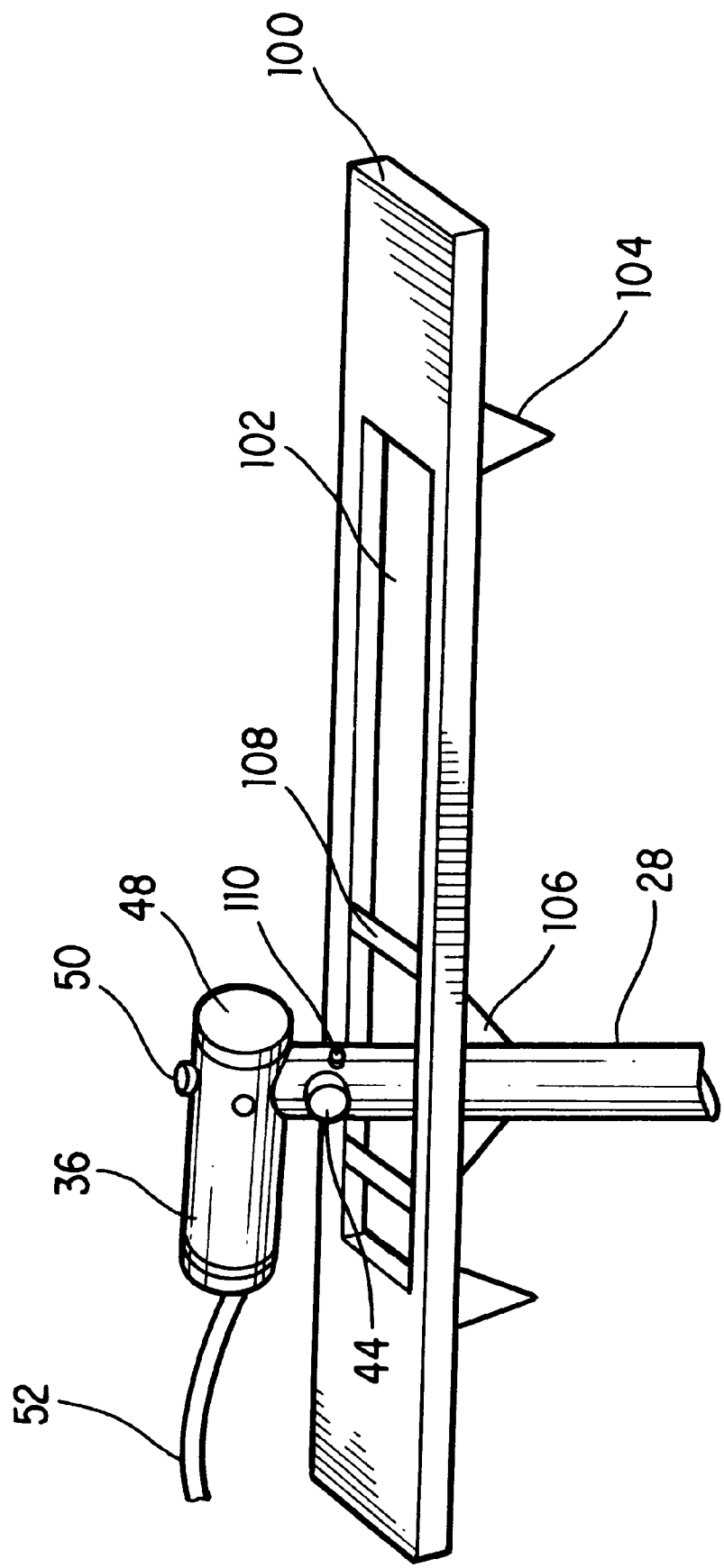
FIG. 7 is a perspective view of the vision system of the present invention mounted in a holding plate.

An alternative to providing the components on a panel is shown in FIG. 7. A holding plate 100 has a slot 102 therein. The support rail also has alignment protrusions 104 extending therefrom to be inserted into the grooves 16 of the shelf for alignment and support. The tube 28 is further equipped with spring loaded flanges 106 which are released after inserting the tube 28 through the slot. A button 110 on the tube allows for release of the flanges 106 and the retraction of the flanges 106 when the tube is to be removed from the holding plate 100.

The slot 102 has stops 108 for supporting the tube 28 in the slot 102 and preventing the tube 28 from moving vertically once inserted in the shelf. The slots are preferably spaced as closely as possible while accommodating the flanges 106. If more than one bulkhead is associated with the removed module, more than one tube could be employed to inspect all bulkheads simultaneously. Additionally, the position of the stops in the slot could be designed for a specific type of module, only allowing the tube to be inserted where a bulkhead is located, speeding up the vertical alignment.

By providing the vision system on a mount configured to be inserted into the rack, the vision card formed thereby may be mounted in the rack without requiring any alterations to the rack design or affect the configuration of the remaining modules. Basically, the vision card of the present invention mimics an optical communication system module in its connection requirements.

Since the vision system of the present invention is provided on a mount in accordance with the parameters of a module for insertion into the rack containing the bulkhead connectors to be inspected, the vision card may be mounted in the rack 10 in place of a module 12 in a conventional manner. Thus, the rack design does not have to be altered to accommodate the vision card in accordance with the present invention.

Thus, the vision system in accordance with the present invention allows fiber connectors mounted in bulkheads on a backplane of a rack to be viewed and inspected without requiring the removal of the fiber connectors and removal of adjacent modules from the rack. Preferably, the vision system is provided on a panel or a holding plate configured to be inserted into the rack, and then the vision system is mounted in the rack in a conventional manner.

If a suitable motor, i.e., with an acceptable form factor for fitting between the modules, is available, the control of the movement of the vision system may be automated. For example, the focus may be automatically adjusted in accordance with the image. Additionally, the vertical movement of the vision system to known locations of the fibers for a particular module may be automated.

Although preferred embodiments of the present invention have been described in detail herein above, it should be clearly understood that many variations and/or modifications of the basic inventive concepts taught herein, which may appear to those skilled in the art, will still fall within the spirit and scope of the present invention as defined in the appended claims and their equivalents. For example, if space between the modules permits, or if the active component housing can be made sufficiently small, the active components housing could be positioned in line with the tube and actually inserted between the modules, thereby reducing the requirements on the optics.

Having thus described our invention, what we claim as new and desire to secure by Letters Patent is as follows:

1. An apparatus for inspecting an end surface of an optical fiber in a bulkhead containing an end surface of an optical fiber to be inspected on a backplane of a rack comprising:

a vision system containing an adapter for connecting the vision system to the bulkhead, a light generator generating light to be delivered to the end surface, and an image capturer receiving an image of the end surface illuminated by the light; and a mount on which the vision system is mounted, the mount being configured to be received by the rack.

2. The apparatus according to claim 1, wherein the mount is a panel having a height of a module to be inserted into the rack.

3. The apparatus according to claim 2, further comprising a vertical rail system on the panel for moving the vision system vertically on the panel.

4. The apparatus according to claim 1, further comprising a hollow tube containing a magnifying lens, the adapter being connected to an end of the tube, the tube delivering light to the end surface and delivering an image to the image capturer.

5. The apparatus according to claim 4, further comprising a relay lens in the hollow tube for relaying an image from the magnifying lens to the image capturer.

6. The apparatus according to claim 4, further comprising a housing containing the light source and the image capturer, the housing being mounted adjacent the tube at an end opposite the adapter.

7. The apparatus according to claim 6, wherein the housing serves as a handle for pressing the tube into contact with the bulkhead.

8. The apparatus according to claim 4, further comprising a focus knob for adjusting a focus position of the magnifying lens.

9. The apparatus according to claim 4, further comprising a panel having a height of a module to be inserted into the rack, the tube being mounted on the panel.

10. The apparatus according to claim 9, wherein the tube is fixedly mounted on the panel.

11. The apparatus according to claim 10, further comprising a vertical movement assembly on the panel for permitting continuous adjustment of a vertical position of the tube along the height of the panel.

12. The apparatus according to claim 4, further comprising a holding plate mounted in the rack, wherein the tube includes spring mounted flanges for removably mounting the tube in the holding plate.

13. The apparatus according to claim 4, further comprising guide slots for locking the tube into position.

14. The apparatus according to claim 13, wherein the guide slots are configured in predetermined locations in accordance with a particular module to be inserted in the rack.

15. The apparatus according to claim 14, further comprising a panel on which the tube is movably mounted, wherein the guide slots are removably provided on the panel.

16. The apparatus according to claim 14, further comprising a focus knob for adjusting a focus position of the magnifying lens.

17. The apparatus according to claim 1, further comprising a display for displaying at least one of an image of the fiber in the bulkhead and results from an automated inspection of the fiber in the bulkhead.

18. The apparatus according to claim 17, further comprising a telescoping mount on which the display is mounted.

19. The apparatus according to claim 17, further comprising a support removably attached to the rack, the display being mounted on the support.

20. A method of inspecting an end surface of an optical fiber on a backplane of a rack, comprising:

providing a vision system containing an adapter for connecting the vision system to a connector connected to the end surface of the optical fiber on the backplane of the rack, a light generator generating light to be delivered to the end surface, and an image capturer receiving an image of the end surface illuminated by the light generator on a mount configured to be received by the rack;

mounting the mount containing the vision system in the rack; and mating the adapter to the connector.

21. The method according to claim 20, further comprising, after said mounting, moving the adapter relative to the end surface.

22. The apparatus according to claim 21, wherein said moving is via a control mounted on a front face of the mount containing the vision system.

23. The method according to claim 20, further comprising mounting an image processor provided on one of the mount and another module configured to be received by the rack in the rack and using the image processor to automatically inspect the fiber.

24. The method according to claim 7, further comprising displaying an image output by said vision system.

* * * * *